United States Patent
Yosizato et al.

[11] Patent Number: 5,879,799
[45] Date of Patent: Mar. 9, 1999

[54] ELASTIC POLYURETHANE FIBERS AND PROCESS FOR PRODUCTION THEREOF

[75] Inventors: Akihiko Yosizato; Kazuyuki Kitamura, both of Moriyama, Japan

[73] Assignee: Asahi Kasei Kogyo Kabushiki Kaisha, Osaka, Japan

[21] Appl. No.: 981,217
[22] PCT Filed: Jun. 21, 1996
[86] PCT No.: PCT/JP96/01728
  § 371 Date: Dec. 19, 1997
  § 102(e) Date: Dec. 19, 1997
[87] PCT Pub. No.: WO97/00982
  PCT Pub. Date: Jan. 9, 1997

[30] Foreign Application Priority Data

Jun. 23, 1995 [JP] Japan ................................. 7-157884

[51] Int. Cl.$^6$ .............................. D02G 3/00; C08G 18/30
[52] U.S. Cl. ................................................. 428/364; 528/76
[58] Field of Search ............................. 428/364; 528/76, 528/901

[56] References Cited

U.S. PATENT DOCUMENTS

| | | | |
|---|---|---|---|
| 4,658,065 | 4/1987 | Aoshima et al. | 564/487 |
| 4,960,849 | 10/1990 | Okabe et al. | 528/76 |
| 5,000,899 | 3/1991 | Dreibelbis et al. | 264/205 |
| 5,061,426 | 10/1991 | Frauendorf et al. | |
| 5,061,777 | 10/1991 | Yoda et al. | 528/76 |

FOREIGN PATENT DOCUMENTS

| | | |
|---|---|---|
| 1/284518 | 11/1989 | Japan . |
| 2-19511 | 1/1990 | Japan . |
| 2-49022 | 2/1990 | Japan . |
| 3-124813 | 5/1991 | Japan . |
| 3-130435 | 6/1991 | Japan . |
| 5-272011 | 10/1993 | Japan . |

*Primary Examiner*—Newton Edwards
*Attorney, Agent, or Firm*—Finnegan, Henderson, Farabow, Garrett & Dunner, L.L.P.

[57] ABSTRACT

A polyurethane elastic fiber made from a polyurethane obtained from a copolymerized polyalkyleneether diol composed of different alkyleneethers containing 2–10 carbon atoms; the polyurethane comprises a urethane portion having a number average molecular weight of 6000–9500 and a urea portion having a number average molecular weight of 650–950. The polyurethane elastic fiber has improved elastic functions such as high elongation at break (elongation at break is 500%, or more), low modulus (300% modulus is 0.20 g/d, or less), excellent low temperature characteristics, and heat resistance; and, therefore, creation of highly excellent converted goods is made possible.

The elastic fiber can be produced at a higher productivity by spinning the polyurethane prepared by reacting a copolymerized polyalkyleneether diol composed of different alkyleneethers containing 2–10 carbon atoms and 4,4'-diphenylmethane diisocyanate to form a fully isocyanate terminated prepolymer for forming the said urethane portion followed by an additional loading of said diisocyanate and reacting a bifunctional diamine such as ethylenediamine to form said urea portion.

6 Claims, 3 Drawing Sheets

ELASTIC POLYURETHANE FIBERS AND PROCESS FOR PRODUCTION THEREOF

FIELD OF THE INVENTION

This invention relates to a polyurethane elastic fiber having a high elongation at break, tensile strength with a low modulus, a lower hysteresis loss, excellent characteristics at low temperature, excellent resistance to abrasion and heat resistance characteristics. This invention, further, provides a process for obtaining such polyurethane elastic fibers under stable producing conditions.

BACKGROUND OF THE INVENTION

Polyurethane elastic fibers are widely used for making various articles in which a stretching performance is needed, such as swimwear, foundation garments, stockings, sportswear, and the like.

In recent years, the use range of polyurethane elastic fibers have been diversified, and a further improvement in polyurethane elastic fibers is needed in characteristics such as elongation, hysteresis loss modulus, or the like, characteristics at a low temperature, and abrasion resistance.

In case where a polyurethane elastic fiber is used in swimwear, foundation garments, stockings, sportswear, and the like, one improvement required is to reduce a differential stress due to strain at deformation in order to minimize the variation in stress, either at the moment when the wearer puts on (or takes off) an elastic garment or at the moment when the garment is elongated to the maximum, whereby putting on (or taking off) of garment can be done smoothly and bending of the body can be done with a reduced constricting feel to the wearer's body. Still another improvement required is to reduce hysteresis loss of stress in stretching so that a good fit to the body can be maintained even after stretching and recovery are repeated.

Still another improvement required is, contrary to the conventionally accepted use of the characteristic high modulus polyurethane fiber by which the smooth body line has been adjusted, to make a fiber exhibit a low modulus so that a garment therefrom can exhibit a more soft fitting to the body characteristic.

Still further improvements required are: to provide a polyurethane elastic fiber capable of providing garments such as winter sports garments which can be put on (or takes off) smoothly even in a very low atmospheric temperature; to provide a polyurethane elastic fiber capable of providing a garment with a reduced constriction to the wearer's body; and further to provide a polyurethane elastic fiber having an enhanced resistance to abrasion which is created by the frictional contact with various bodies or the folded yarn during the wearing of the garment.

In the specification of U.S. Pat. No. 4,658,065, there is a disclosure of a process for producing a copolymerized polyalkyleneether diol in which a polyurethane film using the copolymerized diol is mentioned as an example of an application of the diol. However, it has been found that the copolymerized component of the copolymerized polyalkyleneether diol in this known technology does not sufficiently effect improvements in characteristics pertaining to elastic fiber, especially in elastic properties such as elongation, modulus and hysteresis loss, and the like and similar properties at a low temperature.

In Japanese Unexamined Patent Publication (Kokai) Nos. 1 (1989)-284518 and 2 (1990)-49002, there are described elastic fibers composed of polyurethanes in which copolymerized polyether diols are used as raw material components. The specifications of those patent publications, however, do not mention any polymeric composition design in which a urea portion (urea segment) can significantly improve an elastic fiber in abrasion and heat resistances when the number average molecular weight of urethane portion (urethane segment) is in a region exceeding 6000.

In Japanese Unexamined Patent Publication (Kokai) No. 2 (1990)-19511, there is disclosed an elastic fiber of polyurethane which is prepared by combining a copolymerized alkyleneether diol having a specific molecular structure and a specific molecular weight in a specific combination with mixed diamines as linking agent. However, there is no disclosure pertaining to a polymeric composition design according to which hysteresis loss, low temperature characteristics, abrasion resistance and spinning stability are improved when a number average molecular weight of the copolymerized polyalkyleneether diol is in a high region. Since the use of mixed diamines leads to deterioration of the heat resistance characteristic, there is no disclosure of a polyurethane elastic fiber with an improved converting processability which exhibits high heat and abrasion resistances.

Compared with the known elastic fibers from polyurethane composed of homopolyalkyleneether diol as a raw material, the known technologies so far mentioned above disclose a certain degree of improvement in elastic functions, for examples, higher elongation at break, a smaller differential stress due to strain at elongation, a low modulus at elastic elongation-contraction, a smaller hysteresis loss and excellent elongation-contraction characteristics even at low temperatures.

However, since garments nowadays need to be further improved in wearing comfort, still more improvements than those attained by the above-mentioned known polyurethane elastic fibers are required especially in enhanced elastic functions including those at low temperatures, namely, enhanced elongation, reduced modulus, reduced hysteresis loss as well as improved characteristics at low temperature.

Moreover, the above-mentioned known polyurethane elastic fibers, because of inadequacy with their resistance to abrasion and heat, have problems in that a garment made therefrom tends to be readily damaged by abrasion during wearing; breakage of yarn as incorporated in some converted articles tends to occur, for example, in case where spherical structure portions of a foundation garment such as brassiere and girdle must be shaped under heat and pressure and breakage of running yarns being exposed to a high temperature tends to occur in the spinning chamber of a spinning apparatus.

DISCLOSURE OF THE INVENTION

An object of the present invention is to solve the above-mentioned problems in the prior art and improve polyurethane elastic fibers regarding their elastic properties including elongation, modulus, hysteresis loss and the like, characteristics at a low temperature and simultaneously in abrasion and heat resistance, and provide excellently productive polyurethane elastic fibers as well as process for producing such fibers.

The object of the invention can be attained by a polyurethane elastic fiber in which the polyurethane is an alternating block copolymer composed of a urethane block portion and a urea block portion, the respective number average molecular weights of the urethane and urea portions of the polyurethane being in selected specific ranges, and average repeating number of the urea portion exceeding a specific value.

That is, in accordance with the invention, a polyurethane elastic fiber is characterized in that the polyurethane is obtained from a copolymerized polyalkyleneether diol compared differing alkyleneethers containing 2–10 carbon atoms, 4,4'-diphenylmethane diisocyanate and diamine, the polyurethane having a number average molecular weight of the urethane portion of 6,000–9,500, that of the urea of 650–950 and a value of average repeating number of a urea portion excluding both terminal ends satisfying the formula [1] as defined below:

$$m > [FM] \times (n+1) \quad [1]$$

(in formula [1], m represents an average repeating number of the urea portion excluding both terminal ends of the urea portion, [FM] which is determined by formula [2] below represents a molar ratio of the unreacted remaining 4,4', -liphenylmethane diisocyanate being present after the synthesis of urethane to a copolymerized polyalkyleneether diol, and n represents an average repeating number of the urethane portion)

$$[FM] = an^6 + bn^5 + cn^4 + dn^3 + en^2 + fn + g \quad [2]$$

(in formula [2], n represents an average repeating number of the urethane portion, a–f represent coefficients, and g is constant value; and a is $2.84992 \times 10^{-4}$; b, $-7.1093 \times 10^{-3}$; c, $7.25751 \times 10^{-2}$; d, $-0.390253$; e, $1.18052$; f, $-1.959$; g, $1.49107$.)

In reference to the following chemical representations;
① Copolymerized polyalkyleneether diol;
  HO—R1—OH
(R1 represents an organic remaining radical contained in the copolymerized polyalkyleneether diol.)
② 4,4'-diphenylmethane diisocyanate;
  $R2(NCO)_2$
(R2 represents an organic remaining radical contained in 4,4'-diphenylmethane diisocyanate.)
③ Bifunctional diamine;
  H—R3—H
(R3 represents an organic remaining radical contained in the bifunctional diamine.), a polyurethane composing the polyurethane elastic yarn of the invention has the chemical structure which is essentially composed of structural units (A) and (B) as represented:

structural unit [A], structural unit [B], (in the formulae, L and M are integers of 1 or more);
and the terminal ends of the above-mentioned polyurethane have structures represented by —R3H and/or —R4 (R4 represents an organic group contained in a monoamine).

The polyurethane elastic fiber according to the present invention has an elastic properties to the effect that an elongation at break is 500% or more and that a modulus at 300% elongation is 0.20 g/d or less.

A polyurethane elastic fiber containing a polyalkyleneether diol of which molecular weight is limited in a specific range has been known as in the above-mentioned prior art. There is, however, no known polymeric concept in which respective number average molecular weights of urethane and urea portions are concurrently limited so as to attain improvements in various properties of a polyurethane elastic fiber.

Since the polyurethane, which is described in a working example of U.S. Pat. No. 4,658,065, has a low copolymerizing ratio in the copolymerized polyalkyleneether diol as compared with that of the present invention, its elastic functions including elongation, modulus and hysteresis loss as well as its low temperature characteristics are inferior to those of the present invention.

As disclosed in Japanese Unexamined Patent Publication (Kokai) Nos. 1-284518 and 2-49022, elastic fibers prepared from a conventional process of polyurethane in which a copolymerized polyalkyleneether diol is reacted with 4,4'-diphenylmethane diisocyanate to prepare a isocyanate-terminated urethane prepolymer, subsequently reacted with bifunctional diamine, can make the number average molecular weight of urea portion increase to a certain degree when a number average molecular weight of urethane portion does not exceed 6000 as exemplified in the example. However, when a number average molecular weight of urethane portion becomes between 6000 and 9500 in order to obtain an elastic fiber with greater elongation and smaller modulus, the number average molecular weight of urea portion becomes small and in consequence abrasion resistance and heat resistance of the resulting elastic fiber becomes inadequate and the stability of spinning the fiber cannot be ensured.

As disclosed in Japanese Unexamined Patent Publication (Kokai) No. 2(1990)-19511, when a number average molecular weight of copolymerized polyalkyleneether diol exceeds 3,000, the ratio of 4,4'-diphenylmethane diisocyanate to copolymerized polyalkyleneether diol will be increased so as to attain the number average molecular weight level of the invention and the number average molecular weight of the urea portion will be increased. However, with the use of a high molecular weight copolymerized polyalkyleneether diol, hysteresis loss, characteristic at a low temperature, resistance to abrasion and spinning stability is deteriorated. The use of diamines in the mixture which deteriorates resistance to heat will not lead to a resistances to abrasion and heat as great as those obtained according to the invention.

The present inventors have successfully solved the above-mentioned problems by spinning a polyurethane prepared by a reaction process comprising: reacting a polyalkyleneether diol (hereinafter called copolymerized polyalkyleneether diol) composed of different alkyleneethers containing 2–10 carbon atoms with 4,4'-diphenylmethane diisocyanate in a ratio at which the number average molecular weight of urethane portion is within a range of from 6000 to 9500 so as to form an isocyanate-terminated urethane prepolymer, thereafter adding 4,4'-diphenylmethane diisocyanate to the prepolymer in a ratio at which the number average molecular weight of the urea portion is within a range of from 600 to 950, and reacting with a bifunctional diamine.

That is; the prime feature of the present invention is a polyurethane elastic fiber obtained from a polyalkyleneether containing differing alkyleneethers containing 2–10 carbon atoms, 4,4'-diphenylmethane diisocyanate and a bifunctional diamine in which the respective number average molecular weights of the urethane and urea portions range from 6000 to 9500 and from 650 to 950.

The number average molecular weight for urethane portion (Ms) may be computed by the following formula [3] based on the number average molecular weight of a copolymerized polyalkyleneether diol and the molar ratios between a copolymerized polyalkyleneether diol and 4,4'-diphenylmethane diisocyanate:

$$Ms = \{Mn + 250 \times (N-[FM])\}/(N-[FM]-1) - 500 \quad [3]$$

(Ms represents number average molecular weight for urethane portion; Mn represents number average molecular weight for a copolymerized polyalkyleneether diol; N represents the molar ratio of 4,4'-diphenylmethane diisocyanate in the synthesis of urethane to a copolymerized polyalkyleneether diol; [FM] represents the molar ratio of the unreacted remaining 4,4'-diphenylmethane diisocyanate in the reactant after the synthesis of urethane to a copolymerized polyalkyleneether diol and may be calculated according to the following formula [A21] by L. H. Peebles. Jr., which is described in Macromolecules, 7(6), 872–882, 1974).

$$\mu(X_1^0/A_1)^{(1/2}\mu) + (\mu-1)(X_1^0/A_1) = 2\mu(A_1-B_1)/A_1 \quad [A21]$$

$A_1$ represents number of mole of diisocyanate in a loading stock in the synthesis of urethane; $B_1$ represents number of mole of polyalkyleneether diol in a loading stock in the synthesis of urethane; $X_1^0$ represents number of mole of the unreacted remaining diisocyanate after the synthesis of urethane; $\mu$ represents the ratio of reaction constants; $N=A_1/B_1$ and $[FM]=X_1^0/B_1$; if $B_1$ equal 1 mole, $N=A_1$, and $[FM]=X_1^0$, substituting these relation to formula [A21] makes [A21'].

$$\mu([FM]/N)^{(1/2}\mu) + (\mu-1)([FM]/N) = 2\mu(N-1)/N \quad [A21']$$

And [FM] in formula [A21'] is computed. The given value for $\mu$ is 1.15, which has been found based on the following experiment:

A synthesis of polyurethane was carried out with the use of $A_1$ mole of 4,4'-diphenylmethane diisocyanate and $B_1$ mole of a copolymerized polyalkyleneether diol, and then an excess molar amount of ethanol over the isocyanate remaining in the reactant was added to block the remaining terminating isocyanate group. $X_1^0$ was found by using a gel permeation chromatography (GPC), and the obtained value was in place of the corresponding term of formula [A21'] to obtain a $\mu$.

Namely, the greater the number average molecular weight of a copolymerized polyalkyleneether diol becomes, or the closer the value of an excessive mole amount of 4,4'-diphenylmethane diisocyanate become 1 in the synthesis of urethane prepolymer, the greater the number average molecular weight of the urethane portion becomes.

A number average molecular weight of urea portion can be made greater, when the number of moles of a copolymerized polyalkyleneether diol is brought to one, either the greater the excessive amount of a loaded 4,4'-diphenylmethane diisocyanate becomes, or the more the amount of additionally loaded 4,4'-diphenylmethane diisocyanate becomes, or the higher the molecular weight of a bifunctional diamine becomes. When molecular weight of a bifunctional diamine is increased, it is, however, required, due to decrease in hydrogen bond between urea portions, that the urea portion should have a greater number average molecular weight for enhancing heat resistant characteristics of polyurethane.

The number average molecular weight of urea portion (Mh) may be determined by formula [4] below in which the calculation is made based on the amount of unreacted remaining 4,4'-diphenylmethane diisocyanate [FM] according to the molar ratio of 4,4'-diphenylmethane diisocyanate to a copolymerized polyalkyleneether diol and additionally loaded 4,4'-diphenylmethane diisocyanate.

$$Mh = \{C(N+A-1) + 250 \times ([FM]+A)\}/(N-[FM]-1) + 500 \quad (4)$$

(In the formula, Mh represents number average molecular weight of an urea portion; C, molecular weight of a bifunctional diamine; N, the molar ratio of a 4,4'-diphenylmethane diisocyanate to copolymerized polyalkyleneether diol in the synthesis of urethane; A, the molar ratio of the additionally loaded 4,4'-diphenylmethane diisocyanate after the synthesis of urethane to copolymerized polyalkyleneether diol; [FM], the molar ratio of to the unreacted remaining 4,4'-diphenylmethane diisocyanate being present after the synthesis of urethane to the copolymerized polyalkyleneether diol, which may be calculated by the afore-mentioned formula [A21'].)

BEST MODE FOR CARRYING OUT OF THE INVENTION

Figure 1:
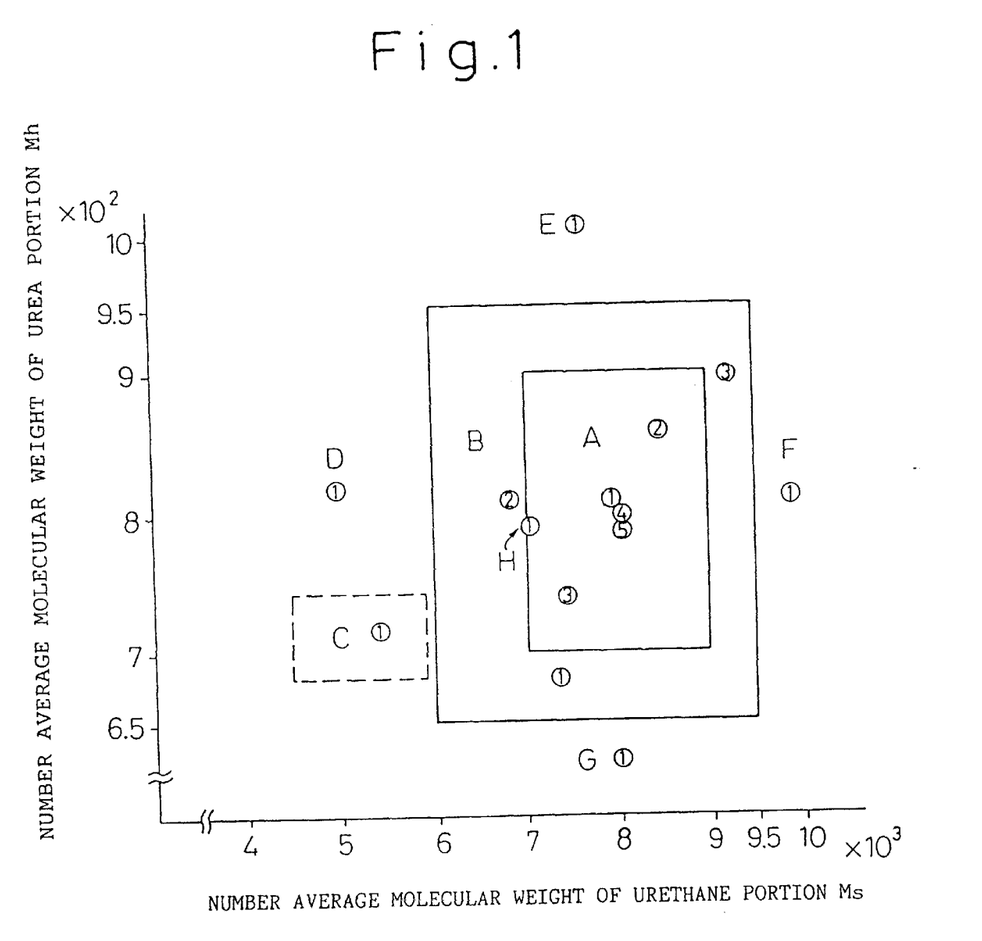
FIG. 1 illustrates the preferable ranges for urethane and urea portions in accordance with the invention.

The preferred ranges for number average molecular weights of urethane and urea portions of the polyurethane employed in a polyurethane elastic fiber according to the invention are shown in FIG. 1. FIG. 1 is a diagram in which the number average molecular weight of urea portion for a polyurethane elastic fiber is taken in the ordinate axis and the number average molecular weight of urethane portion thereof is taken in the abscissa.

The respective ranges of number average molecular weights of the urethane and urea portions of the polyurethane fiber in accordance with the invention fall within region B in the Figure, namely, the number average molecular weight of the urea portion ranges 6000–9500 and that of the urea portion ranges 650–950 and preferably within region A where the number average molecular weight of the urea portion ranges 7000–9000 and that of the urea portion ranges 700–900. When number average molecular weight of urethane portion is less than 6000, an elongation degree of the polyurethane fiber cannot be sufficiently high and modulus of the fiber is undesirably high. For these reason, if the resulting fiber is used for pantyhose, foundation garments and the like, it is difficult to obtain a garment having a soft fitting as well as an excellent wear serviceability (a garment which be put on (taken off) with ease).

When a number average molecular weight of the urethane portion exceeds 9,500, the properties of resistance to abrasion and resistance to heat for the fiber may be reduced, and lack properties of durability for a garment in use, particularly an abrasion resistance in case where the fiber is used in garments such as pantyhose. In addition, a stable production of yarn may be difficult because breakage of running spun yarn tends to occur in the spinning chimney in dry spinning at an elevated temperature. Further, a polyurethane fiber yarn produced under such unstable spinning condition tends to have fluctuating thickness along the length of yarn which lead to occurrence of objectionable bar-like miss-take up marks in the surface of knitted fabric converted therefrom, whereby commercial value being impaired. Further, in heat-press shaping of spherical portion of a foundation garment, breakage of yarn incorporated in the portion may occur due to lack of a heat resistance property of the yarn.

When a number average molecular weight of the urea portion is below 650, abrasion resistance as well as heat resistance tends to be deteriorated. If the value exceeds 950, cohesion of the urea portion increases and an unstable spinning dope may be formed giving rise to formation of gelated dope with age thereby reducing the spinnability (availability of fine sized filament) of the spinning dope. Namely, as compared with the present invention, polyurethane in region C where a number average molecular weight of urethane portion is below 6000, produces a fiber exhibiting a low elongation and high modulus, and the stability of spinning is not as good as that attained by the present invention. In region D the number average molecular weight of the urethane portion is below 6000, and that of the urea portion is greater than that in region C. Consequently, the resulting fiber exhibits a lower elongation and a higher modulus. The property of heat resistance is improved due to an increased ratio of urea portion to urethane portion, but the stability of the viscosity of the spinning dope is deteriorated resulting in a reduced spinnability whereby the stability of spinning is lowered.

In region E in which the number average molecular weight of urea portion is greater than 950, the viscosity of a spinning dope prepared from the polymer is much deteriorated in stability and readily gelated.

In region F in which the number average molecular weight of urethane portion of a polymer is greater than 9500, the polymer exhibits a low breaking strength, low abrasion resistance and heat resistance, and its spinning stability is deteriorated.

In region G in which the number average molecular weight of urea portion is not greater than 650, the polymer exhibits, as in the polymer within region F, a low breaking strength, low abrasion resistance and heat resistance and an inferior spinning stability.

The second feature of the invention lies in that an average repeating number of urea portion excluding the terminal ends, satisfies the afore-mentioned formula [1].

$$m > [FM] \times (n+1) \qquad [1]$$

(in formula [1], m represents an average repeating number of the urea portion excluding both terminal ends of the urea portion, [FM] which is determined by formula [2] below, represents a molar ratio of the unreacted remaining 4,4'-diphenylmethane diisocyanate being present after the synthesis of urethane to a copolymerized polyalkyleneether diol, and n represents an average repeating number of the urethane portion)

$$[FM] = an^6 + bn^5 + cn^4 + dn^3 + en^2 + fn + g \qquad [2]$$

(in formula [2], n represents an average repeating number of the urethane portion, a–f represent coefficients, and g is constant value; and a is $2.84992 \times 10^{-4}$; b, $-7.1093 \times 10^{-3}$; c, $7.25751 \times 10^{-2}$; d, $-0.390253$; e, $1.18052$; f, $-1.959$; g, $1.49107$.)

The molar ratio [FM] of the unreacted 4,4'-diphenylmethane diisocyanate being present after the synthesis of urethane to copolymerized polyalkyleneether diol can be determined by formula [2] which represents a regression equation with respect to the average repeating number n of urethane portion in accordance with the calculating method as described in the literature reported by L. H. Peebles Jr. (Macromolecules, 7 (6), 872–882, 1974). Namely, [FM] can be formulated as a function for n by using [FM] which can be obtained by providing respective values for N and $\mu$ (=1.15) in formula [A21'] and n which is obtained by NMR hereinafter mentioned.

$$[FM] = an^6 + bn^5 + cn^4 + dn^3 + en^2 + fn + g \qquad [2]$$

(in formula [2], n represents an average repeating number of the urethane portion, a–f represent coefficients, and g is constant value; and a is $2.84992 \times 10^{-4}$; b, $-7.1093 \times 10^{-3}$; c, $7.25751 \times 10^{-2}$; d, $-0.390253$; e, $1.18052$; f, $-1.959$; g, $1.49107$).

When an additional amount of aromatic diisocyanate is loaded in order to increase a number average molecular weight of urea portion after synthesis reaction of urethane, amount m of the aromatic diisocyanate in the urea portion excluding the both terminal ends becomes greater than the value obtained according to formula [2]. In contrast with this, the value obtained according to formula [2] equals m when the additional loading is omitted.

When a molecular weight of a copolymerized polyalkyleneether diol is made to exceed 3000, a number average molecular weight of a urea portion increases with an increasing proportion of 4,4'-diphenylmethane diisocyanate to a copolymerized polyalkyleneether diol even when any additional 4,4'-diphenylmethane diisocyanate is not loaded after synthesis of urethane (see H in FIG. 1). Low temperature characteristics such as hysteresis loss, residual strain and the like, abrasion resistance and spinning stability of such polymer as obtained in the above-mentioned manner are not as good as those of a polymer in accordance to the invention.

As discussed above, abrasion resistance as well as heat resistance can be improved by increasing the number average molecular weight of urea portion by charging an additional 4,4'-diphenylmethane diisocyanate even when a copolymerized polyalkyleneether diol having a greater molecular weight is used. However, in order to attain a polymer exhibiting a lower hysteresis loss and more improved characteristic of elastic contraction at a low temperature region, it is preferred that a number average molecular weight of urea portion is increased by loading an additional 4,4'-diphenylmethane diisocyanate after synthesis of polyurethane with the use of a copolymerized polyalkyleneether diol having a molecular weight of less than 3,000.

Polyurethane elastic fiber knitted with nylon or polyester fiber yarn is generally elongated by about 50% when it is incorporated in a cloth piece and by about 150% when it is worn in the form of clothing. The fiber is often elongated more than 300% when a wearer puts on or takes off pantyhose, or when wearer of a sports garment, for an example, leotard performs a violent physical exercise. It is not desirable that an elastic modulus of polyurethane elastic fiber is 0.2 g/d or more, because a wearer may have a constricted feeling. On the other hand, the fiber is difficult to handle when modulus of the fiber is low because fiber yarn tends to be broken in the course of a converting process to fabrics. A fiber exhibiting an elongation of 500% or more, can prevent occurrence of troubles as discussed above because a higher-draft processing means can be readily applied.

The polyalkyleneether diol usable in the invention is a copolyalkyleneether diol formed by combining more than 2 kinds of alkylene groups including straight chain alkylene group having 2 to 10 carbon atoms such as ethylene, propylene, tetramethylene, hexamethylene, decamethylene and the like, and a ramified alkylene group having 2 to 10 carbon atoms such as 1,2-propylene, 3-methyltetramethylene, 3-methylpentamethylene, 2,2-dimethylpropylene and the like with ether bond; in which the more than 2 kinds of alkylene groups are bonded by ether linkage in alternate, block or random manner.

Let the differing alkylene groups be A and B respectively, and $R_1$-$R_6$ be polyalkylene ether groups comprising A or B, the following copolymerized polyalkyleneether diol are given by way of examples:

HO—$R_1$O—A—O—B—O$R_2$—OH,
HO—$R_3$O—A—O—A—O—A—O—B—O—B—O—B—O$R_4$—OH,
HO—$R_5$O—A—O—B—O—A—O—A—O—B—O$R_6$—OH.

Compared with polytetramethyleneether glycol (PTMG) which is a broadly used homopolyalkyleneether diol as raw material for a polyurethane elastic fiber, the polyurethane elastic fiber of the invention, in which a copolymerized polyalkyleneether diol comprising more than 2 kinds of alkylene groups is incorporated to produce a polyurethane composed of a urethane portion having a number average molecular weight of 6000–9500 as well as a urea portion having a number average molecular weight of 650–950, is improved in elastic properties. Namely, the polyurethane elastic fiber of the invention exhibits ② a high elongation at break, ② a low modulus as well as a reduced variation in stress under deformation (strain) at elongation, ③ a reduced hysteresis loss of stress at elastic recovery from an elongation and ① a greater elastic recovery from elongation at low temperature below 0° C. Accordingly, such garments as swimwear, foundation garments, pantyhose and sportswear in which the improved fiber is used, exhibit excellent elastic function; hence the garments have a pleasing wearabilty. With a view for obtaining a polyurethane elastic fiber having a prerequisite in water resistance, light resistance, abrasion resistance and elastic function, it is preferred that one of the alkylene groups composing the copolymerized polyalkyleneether diol is tetramethylene group which is copolymerized with another alkylene group. Preferred copolymerizable alkylene groups are 2,2-dimethylpropylene, 3-methylpentamethylene and 3-methyltetramethylene groups, especially 2,2-dimethylpropylene groups.

An alkyleneether unit other than tetramethylene group is contained preferably in an amount ranging from 4 mole % to 85 mole %, more preferably in an amount ranging from 8 mole % to 40 mole %. When the amount is less than 4 mole %, improvement in elastic function of spandex is poorly effected, while when the amount exceeds 85 mole %, tenacity or elongation of elastic fiber tends to be deteriorated. Use can be made of a mixture of polyalkyleneether diols composed of a copolymerized polyalkyleneether diol having a high content of alkylene ether unit other than tetramethylene group and homopolyalkyleneether diol such as polytetramethyleneether diol (PTMG), in which the alkyleneether diol unit other than tetramethyleneether diol is mixed within the above-mentioned range.

It is preferred that a copolymerized polyalkyleneether diol which can be used in the invention, has a number average molecular weight of from 500 to 4000. When a number average molecular weight is 500 or less, elongation at break and resistance to heat may be deteriorated. When a number average molecular weight exceeds 4000, hysteresis loss as well as residual strain at low temperature tends to increase, and abrasion resistance and spinning stability may be deteriorated. A more preferable number average molecular weight is in a range between 1,000 and 3,000.

In the present invention, use of 4,4'-diphenylmethane diisocyanate can be made solely or in combination with an aromatic diisocyanate such as 2,4'-diphenylmethane diisocyanate in a ratio up to 20 mole per cent. Alternatively, an isocyanate compound having masked isocyanate groups which can be converted into free isocyanate group may be used as 4,4'-diphenylmethane diisocyanate.

As a bifunctional diamine capable of reacting with the isocyanate groups, a conventional chain extender in a synthesis of polyurethane technology, namely a diamine compound having at least 2 hydrogen atoms capable of reacting with isocyanate and having a molecular weight of 500 or less, can be used. Such compounds are diamines including ethylenediamine, propylenediamine, tolylenediamine, m-xylenediamine, 1,3-diaminocyclohexane, isophoronediamine, hydrazine, 4,4'-diaminodiphenylmethane, dihydrazide, pyperazine and the like. Ethylenediamine, 1,2-propylenediamine and 1,3-diaminocyclohexane are preferred. Use of ethylenediamine is especially preferred because its use enhances the hydrogen bond potential of the urea group so that heat resistance characteristic of resultant polyurethane may be improved. Ethylenediamine may be used solely or in a mixture with the above mentioned diamine compound if the diamine compound amounts to 30 mole % or less in the mixture. When the amount of the diamine compound exceeds 30 mole per cent, the heat resistance property of the resulting polyurethane may be remarkably deteriorated. Alternatively, ethylenediamine can be incorporated with a compound containing at least one active hydrogen such as dialkylamines which is capable of reacting with isocyanate group.

Regarding a preparation of urethane prepolymer using a copolymerized polyalkyleneether diol and 4,4'-diphenylmethane diisocyanate, any urethane reaction technique in the art may be employed. Namely, a copolymerized polyalkyleneether diol and excessive molar amount of 4,4'-diphenylmethane diisocyanate are reacted either in bulk polymerization or in an inert solvent so as to produce urethane prepolymer so that the urethane portion in a final polyurethane having a number average molecular weight Ms of from 6000 to 9000 thereby making the urethane portion. A reaction for obtaining an Ms of from 6000 to 9000 can be attained by adjusting the number average molecular weight Mn of a copolymerized polyalkyleneether diol and the molar ratio N of 4,4'-diphenylmethane diisocyanate to a copolymerized polyalkyleneether diol.

Namely, when N is arbitrarily given, [FM] can be found using N and equation [21']. From [FM], N and Mn, Ms can be obtained using formula [3]. A simulation in which values for Mn and N are varied, is carried out so that a combination of Mn with N in which Ms amounts to between 6000 and 9500 is determined.

After that, 4,4'-diphenylmethane diisocyanate is additionally loaded to the urethane prepolymer having terminating isocyanate groups so that urea portion having a number average molecular weight Mh between 650 and 950 and thereafter, a bifunctional amine is reacted for producing urea portion thereby polyurethane comprising an alternate block copolymer having urethane and urea portions with a prescribed number average molecular weights can be obtained. For obtaining an Mh of 600–950, reaction can be achieved by carrying out a reaction through adjusting N, the molecular weight C of a bifunctional diamine and molar ratio A of 4,4'-diphenylmethane diisocyanate which is additionally loaded to a copolymerized polyalkyleneether diol. Namely, when an N is arbitrarily given, [FM] can be found using N and equation [21']. Then, Mh can be obtained by formula [4] using the [FM], C and A. A simulation in which values for N, C and A are varied, is carried out so that a combination of N, C and A in which Mh falls between 600 and 950 is determined.

Regarding stoichiometric ratios for each compound used in the invention, it is preferable that the sum of the hydroxyl group of a copolymerized polyalkyleneether diol and active hydrogen of active hydrogen containing compound is in a range from more than 1.00 equivalent to less than 1.07 equivalent to 4,4'-diphenylmethane diisocyanate.

A polyurethane composing the polyurethane elastic fiber of the invention has preferably a reduced viscosity ($\eta$sp/c) of 1.1–3.5 dl/g. A polyurethane elastic fiber having an excellent elastic recovery can be obtained within this range of reduced viscosity.

Measurement of reduced viscosity is a value calculated from ($\eta/\eta_0-1)/C_0$) in N,N'-dimethylacetoamide solution (in the formula, $C_0$ represents the concentration of the solution (0.5 wt %), polymer 0.5 g/DMAc 99.5g; $\eta$ represents falling time in seconds of a diluted solution in an Ostwald viscometer; $\eta_0$ represents the falling time of DMAc in the same viscometer; and the measurement is carried out in an ambient temperature of 20° C.).

A heat stabilizer, an anti-oxidation agent, an ultraviolet ray proof agent, a yellowing proof agent, a heat discoloring proof agent, a chlorine-based disinfectant for pool such as MgO, ZnO, a hydrotalsite or the like may be incorporated in the polyurethane. The polyurethane as described above can be shaped into fibers by any of the known dry-spinning and wet-spinning technique. As a finish oil, polyalkylsiloxane, polyester modified silicone, polyether modified silicone, amino-modified silicone, fine mineral particles such as talc, silica, colloidal alumina, powder of salt of high alkyl fatty acid such as magnesium stearate, calcium stearate, carboxylic acid of high alkyl fatty acid, higher aliphatic alcohol, solid waxes at room temperature such as paraffin, polyethylene and a combination of any above mentioned agents may be applied to the as-spun fibers.

The polyurethane elastic fiber can be used either in the bare form or in the form of a covered elastic yarn prepared by covering with a known fiber, for examples, polyamide fibers, wool, cotton, regenerated fibers and polyester fibers and the like.

A polyurethane elastic fiber of the invention is particularly suitable for use in making tights and pantyhose. Although the field of use need not be limited, the material can be used for making foundation garments, garters (suspenders), rib tops, corsets (stays), bandages for surgery, woven or knitted swimwear and sportswear.

In the above description of the invention, examples and comparatives described hereafter, methods for determination of n, m, the number average molecular weight of urethane and urea portions in a polyurethane polymer, method for measurement of heat-resistance, method for determination of abrasion resistance, and preparation of pantyhose are carried out in accordance with the methods described as follow:

(1) Method for determination of n, m, the number average molecular weights of urethane and urea portions in a polyurethane A polyurethane is treated in a Soxhley extractor using chloroform as solvent. After removal of organic additives, chloroform is removed by drying. Measurement is carried out on the conditions with use of a device as described below:

| Apparatus | NMR measuring apparatus JNM-GX400, NIPPON DENSI INC. |
|---|---|
| Measuring nucleus | 1H |
| Resonant frequency | 400 MHz |
| Frequency of integration | 128 times |
| Temperature at measurement | 20° C. |
| Solvent | Deuterated dimethylformamide |
| Concentration at measurement | 3 weight % |
| Chemical shift standard | Tetramethyl silane (0 ppm) |

Figure 2:
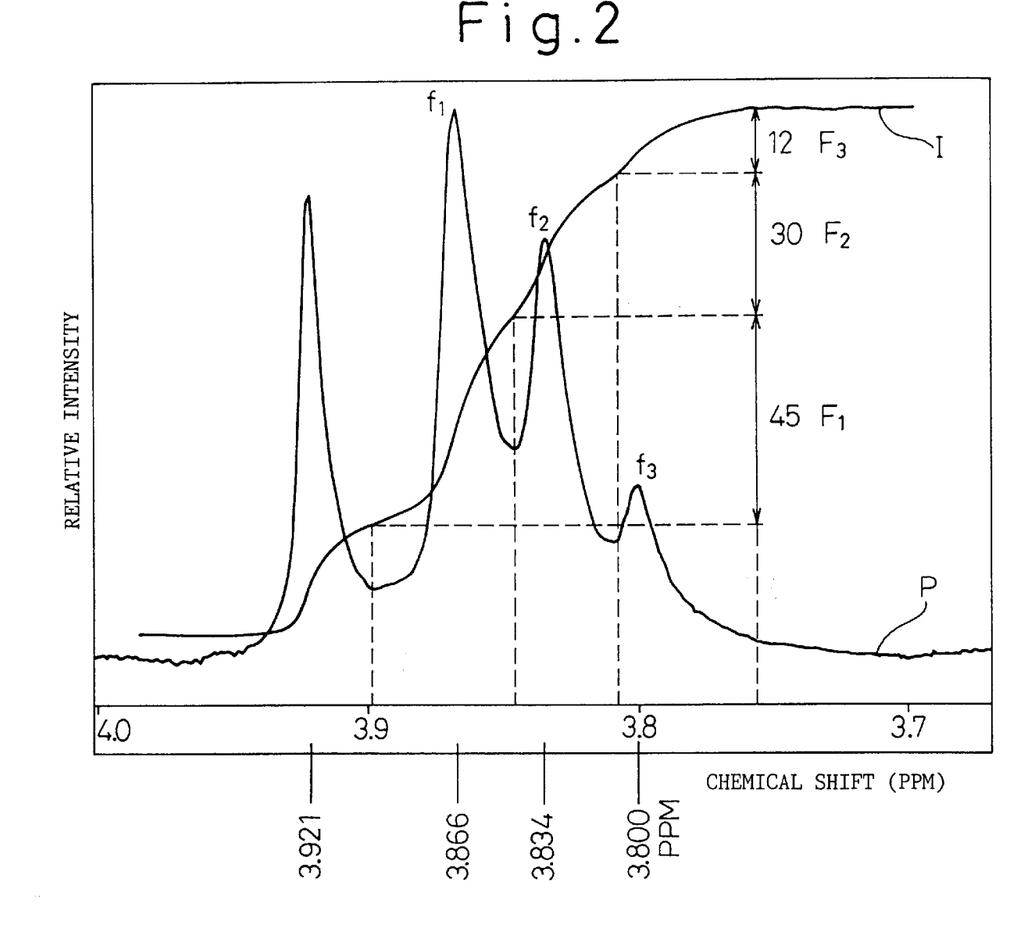
FIG. 2 illustrates a spectrum diagram of NMR measurement of the polyurethane in the Example 1 of the invention.

An example of a resultant NMR spectrum measured under the conditions stated above is shown in FIG. 2.

In FIG. 2, NMR spectrum is represented by P and the integration curve thereof is shown as designated as I.

There are shown a peak ($f_1$) representing methylene group of 4,4'-diphenylmethane diisocyanate with its the both terminal ends being urethane linkage at 3.866 ppm, peak ($f_2$) representing methylene groups of 4,4'-diphenylmethane diisocyanate with its one end being urethane linkage and the other remaining end being urea linkage at 3.834 ppm, and peak ($f_3$) representing 4,4'-diphenylmethane diisocyanate with its both ends being urea linkage at 3.800 ppm.

Let the height of the integration curve from the kick-off point of peak $f_1$ up to the terminal end be $F_1$, and in the same manner, the corresponding height of the integration curve for $f_2$ and $f_3$ be $F_1$ and $F_2$ respectively. Then, $F_1$–$F_3$ are obtained by actual measurement on the chart.

An example of a schematic structure for a polyurethane polymer of the invention is shown as follows:

-[CoPAE-(MDI-CoPAE)n-MDI-EDA-(MDI-EDA)m-MDI]o-
urethane portion          urea portion (wherein CoPAE represents the residual group of copolymerized polyalkyleneether diol, MDI represents the residual group of diphenylmethane diisocyanate, EDA represents the residual group of ethylene diamine; and in FIG. 2, $f_1$ –$f_3$ correspond to spectrum positions of methylene group of MDI linked with the residual group of each compound which is located adjacent with MDI.)

When the polyurethane polymer is represented as the above, the average repeating number n, m can be obtained by means of n=2×($F_1/F_2$), m=2×($F_3/F_2$).

Hence, a number average molecular weight of urethane and urea portions can be calculated respectively according to the following <1> and [2].

<1> number average molecular weight of urethane portion=(number average molecular weight of copolymerized polyalkyleneether diol+molecular weight of 4,4'-diphenylmethane diisocyanate)×n+number average molecular weight of copolymerized polyalkyleneether diol <2> number average molecular weight of urea portion= (molecular weight of diamine compound+molecular weight of 4,4'-diphenylmethane diisocyanate)×m+molecular weight of diamine compound+2 ×molecular weight of 4,4'-diphenylmethane diisocyanate (2) Method for determination of heat resistance:

A test yarn with a length of 14 cm is elongated up to 21 cm. The elongated test yarn is pressed fittingly onto a heated stainless steel column of which the surface temperature is at 180° C. (about a 1 cm long portion of the yarn is in contact with the heated column) and the period of time needed to cause the yarn to be broken is counted in seconds.

(3) Method of determination of aging-by day stability of viscosity of polyurethane dope:

A polyurethane dope is put into a closed container while suppressing dissipation of the solvent. Then, viscosity of the polymer at 30° C. after the dope has been left standing in SAFETY OVEN (trade name SPS-TYPE 222; a product by Tabai Espec Corp.) for 4 weeks, is measured using a rotary viscometer (trade name EDH-TYPE, a product by Tokyo Keiki Co. Ltd.). Aging-by day stability of a spinning dope is determined in accordance to the differential viscosity increase as observed before and after standing in the oven. The smaller the differential rise a dope exhibits, the better the commercially stable productivity the dope is.

(4) Method for evaluation of spinning stability:

In a dry-spinning, a yarn having a 40 denier/6 filaments is initially spun at a winding speed of 300 m/min for 3 minutes, and thereafter the winding speed is gradually increased until the yarn being spun begins to break in the spinning chimney. When the yarn breakage takes place at a winding speed of X m/min, the spinning stability is determined as a critical single filament denier per filament which is a calculated value obtained by using the following formula:

critical single filament denier (denier)=40/6×300/X

The smaller the denier per single filament (critical single filament denier) becomes, the more stable the spinning of the polyurethane is.

In the example, the spinning dope was aged for one month after the polyurethane had been polymerized. A gelated dope of which its spinnability has deteriorated after being aged cannot be estimated because it was difficult to transport the dope through the conduits to the spinneret in the head of spinning machine.

(5) Method for measurement of breaking strength, elongation, 300% modulus, 200% stress retention and residual strain:

Using a tensile tester (trade name; UTM-III, Type 100, a product by Orientic Corp.), a specimen of a yarn 5 cm long is pulled under conditions of 20° C. and 65% relative humidity at a rate of 50 cm/min to determine a breaking strength, elongation at break and 300% modulus.

Determination of hysteresis loss at 200% is carried out by obtaining 200% reciprocal moduli at the third elongation-contraction cycle in 0–300% elongation-contraction repeating cycle and calculated using the following equation:

$$200\% \text{ stress retention} = \frac{f_R}{f_S} \times 100$$

(in the formula, $f_R$ is the return–200% modulus observed in the third cycle of 0–300% elongation-contraction repeating cycles, and fs is the onward–200% modulus observed in the third cycle of 0–300% elongation-contraction repeating cycles.)

A greater value of stress-retention means a smaller hysteresis loss.

Figure 3:
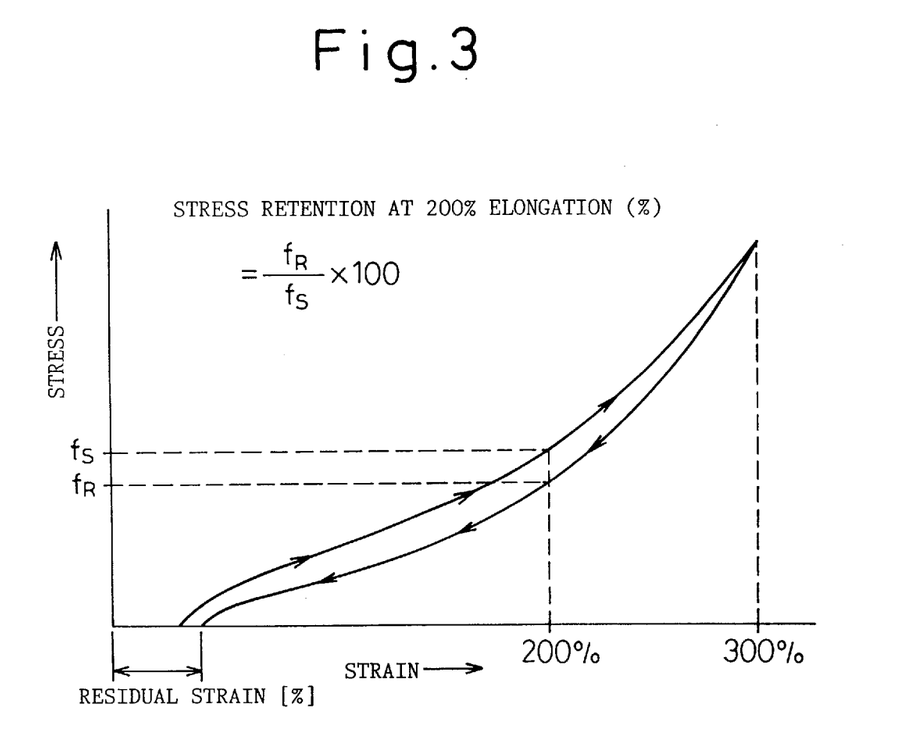
FIG. 3 illustrates a chart showing a curve obtained at the third zero through 300% stretch-contraction curve as well as residual strain of a polyurethane elastic fiber of the invention.

Residual strain is determined by measuring the magnitude of strain (deformation) when the return modulus in the third cycle of 0–300% elongation-contraction repeating cycles is zero in FIG. 3.

Measurement at a low temperature is carried out at a temperature of –20° C. using the above-mentioned tensile tester equipped with a constant temperature bath Type TFL-III 1-40B-S.

(6) Method for evaluation of abrasion resistance (elongation-contraction cycle):

A nylon yarn (a product of Asahi Chemical Industry Co. Ltd., trade name Leona 10d/5f) and a test specimen (polyurethane elastic fiber) are doubled and the doubled yarn is fed at a feed speed of 35 m/min to produce a tubular knitted fabric having a length of about 15 cm. Evaluation of abrasion resistance is made on the tubular knitted fabric which has been processed by dying and laundering.

That is, the fabric is dyed with a fluorescent brightening agent in a freely relaxed state. With a dye bath prepared by dissolving 1.2% owf (1.2 g based on 100 g of the knitted fabric) of BLANKOPHOR CL (a dye available from BAYER AG), 0.4 g/l of IONETRUP 50 (a product available from Sanyo Chemical Industries Co. Ltd.), 0.5 g/l of ammonium acetate and 2 ml/l of acetic acid, the fabric is dyed in a dyeing bath at a bath ratio of 1:30 while boiling for 45 min.

After the treated tubular knitted fabric is dried in an ambient atmosphere for 12 hours, the fabric is tumbled, as a laundering, in 40 liters of water at 40° C. containing 0.83 g/l of New Beads available from Kao Corp. for 40 minutes in a washing machine, and the tumbled fabric is then rinsed in a running water for 10 minutes and successively followed by drying in air at 45° C. for 8 hours; this is referred to as one round of laundering. Using a de Mattia testing machine, a repeated elasticity expansion and contraction test is carried out under a condition of 220% elongation (repetition of 0–220% expansion) at 200 rpm. After the prescribed times of repetition, the tested fabric is examined to find the state of a polyurethane elastic fiber broken by rubbing abrasion with nylon yarn. Abrasion resistance is rated according to the maximum number of elasticity expansion-contraction cycles before breakage of polyurethane fiber is observed.

(7) Method of preparation of pantyhose:

A nylon yarn (a product of Asahi Chemical Industries Co. Ltd., trade name Leona 10d/5f) and test specimen (polyurethane elastic fiber) is treated on a covering machine (draft ratio 2.7, 1800 T/m). The covered yarn is knitted into a knitted fabric having a total course of 2400. After being pre-set at 50° C., the knitted fabric is dyed at 95° C. for 45 minutes. The dying is followed by treatment with fixing agent and softening finish, and then the fabric is subjected to heat-setting at 125° C. for 15 seconds to obtain finished pantyhose.

(8) Evaluation of resistance to wearing

With use of a polyurethane elastic fiber prepared according to Examples and Comparative Examples, pantyhoses are prepared as in the manner described above. Ten women aged between twenty and forty, who have been randomly selected as a panel, are asked to wear the pantyhose. Each panel wears the pantyhose for 8 hours a day, and after a day's wearing the respective pantyhose is laundered and dried in the shade. When an occurrence of breakage of polyurethane elastic fiber is not found in a pantyhose, the result is counted as one wear cycle. Repetition of one laundry operation for each wearing of a specimen pantyhose is made until an occurrence of breakage is observed. When an occurrence of breakage is found, the number of wearings before the occurrence of breakage is recorded as wearing durability times and the number of times for the wearers is averaged. In case where any occurrence of breakage could not be found, the wearing cycle is repeated to ten times.

EXAMPLES

The following are Examples illustrating the invention in more detail.

Example 1

1800 g (1 mole) of copolymerized polyalkyleneether diol (copolymerized ratio of NP, 10 mole %) containing tetramethylene group and 2,2-dimethylpropylene (hereinafter represented by NP) of which a number average molecular weight (Mn) is 1800 (1 mole), and 327.5 g (1.31 mole) of 4,4'-diphenylmethane diisocyanate (referred to as MDI-1 in Table 1) were reacted at 80° C. in a dried nitrogen atmosphere for 3 hours while being stirred to obtain a urethane prepolymer with its terminal groups capped with isocyanate groups (hereinafter referred to as prepolymer). After this was cooled to room temperature, the reaction product was additionally loaded with 35 g (0.14 mole) of 4,4'-diphenylmethane diisocyanate (in Table 1, referred to as additionally loaded MDI-2) and 3244 g of dimethylacetamide at room temperature while stirring to make an uniform prepolymer.

On the other hand, a solution obtained by dissolving 25.5 g (0.425 mole) of ethylenediamine (hereinafter referred to as EDA) and 3.8 g (0.052 mole) of diethylamine (hereinafter referred to as DEA) in 1870 g of dimethylacetamide was added to the above-mentioned prepolymer solution at one time under agitation at high speed, and successively reacted at room temperature for one hour to obtain a viscous polyurethane solution having a viscosity of 3500 poise at 30° C. The reduced viscosity ($\eta_{sp}/C$) of the polyurethane was 1.1.

As a result of an NMR analysis of the polyurethane, a spectrum as shown in FIG. 2 was obtained. The heights $F_1$, $F_2$, $F_3$ of peaks $f_1$, $f_2$, $f_3$ of the integration curve were 45 mm, 30 mm and 12 mm respectively.

Based on these data, the average repeating number of urethane and urea portions n, m can be computed as n=3, m=0.8. Hence the number average molecular weight of the urethane portion for this polyurethane was found to be 7950 and that of the urea portion was found to be 808. The [FM] obtained from n was 0.06 and the average repeating number 0.80 of urea calculated to be incorporated with the MDI-2 which was additionally loaded was in good agreement with m.

To this solution, 1 weight % of the polymer solid content of a condensate of p-cresol, dicyclopentadiene and isobutylene having a molecular weight of 2300, 0.5 weight % of 2-[2-hydroxy-3,5-bis (α, α-dimethylbenzyl)phenyl]-2H-benzotriazole on the polymer solid content, 0.5 weight % of amino-modified silicone compound (amino equivalent 350 g/eq) on the polymer solid content, viscosity 60 cst indicated in Example 1 described in specification of Japanese patent application (Tokugan) No. 7–75606) were added to prepare an uniform solution and, thereafter, the solution was deaerated under a reduced pressure at room temperature to produce a spinning dope having a viscosity of 3600 poise and dry-spinning was carried out. In the spinning, using a spinneret with number of hole of 2, the polymer solution was caused to extrude into a heated nitrogen gas atmosphere at 270° C. beneath the spinneret, and was drafted at a ratio of 1.15 between a godet roll and take-up bobbin, and wound up on a take-up bobbin at a winding speed of 700 m/min after the application of an oiling agent composed of dimethyl silicone as a basis, to obtain a polyurethane elastic yarn having a denier of 20. The elastic fiber had a strength of 36 g, an elongation of 647%, and the number of seconds for breakage in contact with heated body at 180° C. was 126 seconds. The results of analysis on the various items of functions for evaluation are given in Table 2.

Example 2–8

In the same manner as in Example 1, polyurethanes were prepared by varying the polyurethane raw materials and loading ratios as indicated in Table 2. The polyurethanes obtained were spun in the same method as that in Example 1 to make polyurethane elastic fibers having a denier of 20. Results of various analysis for evaluation are given in Table 1.

In Table 2, the copolymerized polyalkyleneether diols are referred to as NP for 2,2-dimethylpropylene group and tetramethylene group, MP for 3-methylpentamethylene group and tetramethylene group MB for 3-methyltetramethylene group and tetramethylene group, respectively; and the respective numbers following each copolymerized polyalkyleneethers represent copolymerized ratio thereof in mole %.

Comparative Example 1

2000 g (1 mole) of copolymerized polyalkyleneether diol (copolymerized ratio of NP is 10 mole %) containing tetramethylene group and 2,2-dimethylpropylene group (NP) having a number average molecular weight (Mn) of 2000 and 400 g (1.6 mole) of 4,4'-diphenylmethane diisocyanate (referred to as MDI-1 in Table 1) were reacted under a dried nitrogen stream atmosphere at 80° C. for 3 hours while being stirred to obtain a urethane prepolymer. After being cooled to room temperature, this was added with 3600 g of dimethylacetamide while being stirred for dissolution to make a homogeneous solution.

Separately, a solution obtained by dissolving 34.4 g (0.573 mole) of DEA, 4.02 g (0.055 mole) of EDA in 2089 g of dimethylacetamide was added under a high speed agitation to the above-mentioned prepolymer, and a reaction was carried out at room temperature for a hour to obtain a viscous polyurethane solution having a viscosity of 3900 poise/30° C.

As a result of NMR analysis of the polyurethane, it was found that the average repeating number of urethane n and the number average molecular weight for the urethane portion were 1.51 and 5412, and that the average repeating number of urea m and the number average molecular weight of urea portion were 0.50 and 716. [FM] obtained from n was 0.20 and the average repeating number calculated using this value was found to be 0.50 which is in good agreement with m. A polyurethane elastic fiber a denier of 20 was prepared from the solution in the same method as indicated in Example 1. Results of analysis for various evaluations of this elastic fiber are given in Table 2.

Comparative Example 2–6

In the same methods as indicated in Example 1 and Comparative Example 1 polyurethanes were prepared by varying the polyurethane raw materials and loading ratios for the materials as indicated in Table 1. The polyurethanes obtained were spun in the same method as indicated in Example 1 to obtain polyurethane elastic fibers having a denier of 20. Results of analysis for various evaluations are given in Table 2.

In Table 3, there are given the elastic expansion-contraction characteristic and low temperature characteristics for the polyurethane elastic fibers which were prepared in Examples 1 and 5 and Comparative Examples 1 and 6. Comparative Example 6, in which use was made of a high molecular weight copolymerized polyalkyleneether diol having a number average molecular weight of 3300, can form a urea portion with an increased number average molecular weight without the additional loading of 4,4'-diphenylmethane diisocyanate. It is, however, true that characteristics obtained by Comparative Example 6 such as low temperature characteristics in hysteresis loss and residual strain, abrasion resistance as well as spinning stability cannot be matched with those obtained according to the invention.

As seen from Examples and Comparative Examples, in comparison with a goods made of known fibers, pantyhose and foundation garments produced with the use of the fibers of the invention are exceedingly expandable and soft to the touch, and provide an easy to dress on-off service and nicety to fitting as is suggestive of the fiber with its low hysteresis loss.

In addition, winter season sportswear wherein the present fiber is used, exhibits an exceedingly excellent elongation combined with nicety of fitness even at a low temperature, and goods of excellent durability can be manufactured.

TABLE 1

Raw materials and amount of loading for production of polyurethane

| | Mark referred to in FIG. 1 | Copolymerized polyalkyleneether diol | | | MDI-1 (b) in mole | Additionally loaded MDI-2 (c) in mole | EDA (d) in mole | DEA (e) in mole |
|---|---|---|---|---|---|---|---|---|
| | | Copolymerized ratio % | Number average molecular weight | (a) in mole | | | | |
| Examples | | | | | | | | |
| 1 | A-① | NP 10 | 1800 | 1 | 1.31 | 0.14 | 0.425 | 0.052 |
| 2 | A-② | NP 19 | 1800 | 1 | 1.29 | 0.18 | 0.443 | 0.054 |
| 3 | A-③ | NP 10 | 2000 | 1 | 1.38 | 0.09 | 0.443 | 0.054 |
| 4 | A-④ | MP 19 | 1800 | 1 | 1.31 | 0.14 | 0.425 | 0.052 |
| 5 | A-⑤ | MB 16 | 2000 | 1 | 1.35 | 0.14 | 0.463 | 0.055 |
| 6 | B-① | NP 10 | 1800 | 1 | 1.34 | 0.04 | 0.356 | 0.048 |
| 7 | B-② | NP 10 | 1800 | 1 | 1.38 | 0.15 | 0.503 | 0.055 |
| 8 | B-③ | NP 10 | 1800 | 1 | 1.26 | 0.20 | 0.436 | 0.048 |
| Comparative Examples | | | | | | | | |
| 1 | C-① | NP 19 | 2000 | 1 | 1.60 | — | 0.573 | 0.055 |
| 2 | D-① | MP 18 | 1800 | 1 | 1.59 | 0.13 | 0.689 | 0.062 |
| 3 | E-① | NP 10 | 1800 | 1 | 1.33 | 0.31 | 0.613 | 0.055 |
| 4 | F-① | NP 10 | 1800 | 1 | 1.24 | 0.13 | 0.346 | 0.048 |
| 5 | G-① | NP 10 | 1800 | 1 | 1.31 | — | 0.287 | 0.047 |
| 6 | H-① | MB 16 | 3300 | 1 | 1.85 | — | 0.823 | 0.055 |

TABLE 2

| | Mark referred to in FIG. 1 | NMR analysis | | | Stability of dope viscosity after aging (poise/30° C.) | Spinning stability (denier) | Heat resistance (second) | Strength at break (g) | Elongation at break (%) | Modulus at 300% elongation (g/d) | Abrasion Resistance (elongation-contraction cycle) Evaluated after a dying/laundering cycle (cycle) | Resistance to wearing test number of repeated wearing in average (number of times) |
|---|---|---|---|---|---|---|---|---|---|---|---|---|
| | | Number average molecular weight of urethane portion | Number average molecular weight of urea portion | Formula (2) [FM] × m (n + 1) | | | | | | | | |
| Examples | | | | | | | | | | | | |
| 1 | A-① | 7950 | 808 | 0.80 > 0.24 | 52 | 1.5 | 126 | 36 | 647 | 0.18 | 49000 | 8.5 |
| 2 | A-② | 8364 | 854 | 0.94 > 0.22 | 87 | 1.9 | 130 | 34 | 623 | 0.16 | 44000 | 8.0 |
| 3 | A-③ | 7470 | 746 | 0.60 > 0.30 | 42 | 1.7 | 113 | 34 | 615 | 0.16 | 41000 | 7.8 |
| 4 | A-④ | 8003 | 803 | 0.78 > 0.24 | 34 | 1.6 | 115 | 33 | 627 | 0.16 | 38000 | 7.1 |
| 5 | A-⑤ | 7956 | 800 | 0.77 > 0.28 | 76 | 1.7 | 118 | 32 | 630 | 0.18 | 40000 | 7.2 |
| 6 | B-① | 7395 | 683 | 0.40 > 0.27 | 58 | 2.1 | 98 | 31 | 603 | 0.15 | 40000 | 7.6 |
| 7 | B-② | 6789 | 808 | 0.80 > 0.30 | 99 | 2.0 | 131 | 30 | 600 | 0.19 | 44000 | 7.8 |
| 8 | B-③ | 9177 | 897 | 1.09 > 0.19 | 86 | 2.1 | 103 | 30 | 613 | 0.19 | 42000 | 7.2 |
| Comparative Examples | | | | | | | | | | | | |
| 1 | C-① | 5412 | 716 | 0.50 = 0.50 | 190 | 3.0 | 135 | 30 | 558 | 0.25 | 38000 | 7.2 |
| 2 | D-① | 5001 | 811 | 0.81 > 0.50 | 7200 | 5.1 | 153 | 28 | 455 | 0.28 | 40000 | 7.6 |
| 3 | E-① | 7560 | 1003 | 1.43 > 0.26 | Impossible to be measured (gelated) | Impossible to spin | — | — | — | — | — | — |
| 4 | F-① | 9837 | 805 | 0.79 > 0.17 | 33 | 4.3 | 55 | 25 | 602 | 0.14 | 31000 | 5.8 |
| 5 | G-① | 8006 | 631 | 0.23 ≈ 0.24 | 41 | 5.4 | 35 | 26 | 608 | 0.11 | 28000 | 5.2 |
| 6 | H-① | 7070 | 790 | 0.74 = 0.74 | 97 | 3.3 | 120 | 31 | 607 | 0.18 | 36000 | 6.6 |

TABLE 3

| | | Copolymerized polyalkyleneether diol | | Number average molecular weight of urethane portion | Number average molecular weight of urea portion | Formula (2) [FM] × | | Stretchability Stress retention at 200% (%) | | Residual strain at low temperature (%) |
|---|---|---|---|---|---|---|---|---|---|---|
| | Mark referred to in FIG. 1 | Copoly-merized ratio % | Number average molecular weight | | | m | (n + 1) | 20° C. | −20° C. | −20° C. |
| Examples | | | | | | | | | | |
| 1 | A-① | NP 10 | 1800 | 7950 | 808 | 0.80 | > 0.24 | 89 | 62 | 26 |
| 5 | A-⑤ | MB 16 | 2000 | 7956 | 800 | 0.77 | > 0.28 | 86 | 60 | 39 |
| Comparative Examples | | | | | | | | | | |
| 1 | C-① | NP 10 | 2000 | 5412 | 716 | 0.50 | = 0.50 | 73 | 56 | 43 |
| 6 | H-① | MB 16 | 3300 | 7070 | 790 | 0.74 | = 0.74 | 79 | 32 | 145 |

INDUSTRIAL APPLICABILITY

The polyurethane elastic fiber of the invention exhibits an excellent elastic function and, in particular, a high breaking strength at elongation, a low modulus and low hysteresis loss and excellent characteristics at low temperature, abrasion resistance and heat resistance. The polyurethane elastic fiber according to the invention attains those improvements in end use performance at both low temperatures and elevated temperatures and in thermal processability, which have generally been needed.

By manufacturing clothing such as swimwear, foundation garments, pantyhose, sportswear and the like wherein the polyurethane elastic fiber of the invention is incorporated, items of clothing with superb performance in comfort and durability of wear can be provided.

We claim:

1. A polyurethane elastic fiber in which the polyurethane obtained from a copolymerized polyalkyleneether diol composed of different alkyleneethers containing 2–10 carbon atoms, 4,4'-diphenylmethane diisocyanate and a bifunctional diamine, the polyurethane comprising a urethane portion having a number average molecular weight of 6000–9500, a urea portion having a number average molecular weight of 650–950 and an average repeating number of the urea portion excluding the both terminal ends thereof, satisfying the following formula [1]

$$m > [FM] \times (n+1) \quad [1]$$

(in which m represents average repeating number of the urea portion excluding the both terminal ends, [FM] which is determined by formula [2] represents the molar ratio of the unreacted remaining 4,4'-diphenylmethane diisocyanate being present after the synthesis of urethane to copolymerized polyalkyleneether diol and n represents an average repeating number of the urethane portion)

$$[FM] = an^6 + bn^5 + cn^4 + dn^3 + en^2 + fn + g \quad [2]$$

(in which n represents an average repeating number of urethane portion, a–f represent coefficients and g is a constant value; and a is $2.84992 \times 10^{-4}$; b, $-7.1093 \times 10^{-3}$; c, $7.25751 \times 10^{-2}$; d, $-0.390253$; e, $1.18052$; f, $-1.959$; g, $1.49107$).

2. A polyurethane elastic fiber according to claim 1, characterized in that the fiber has an elongation at break of 500% or more and a modulus at 300% elongation of 0.20 g/d or less.

3. A polyurethane elastic fiber according to claim 1 characterized in that the copolymerized polyalkyleneether diol has a number average molecular weight of 500 to 4000.

4. A polyurethane elastic fiber according to claim 1 characterized in that the copolymerized polyalkyleneether diol has a number average molecular weight of 1000 to 3000.

5. A method for producing a polyurethane elastic fiber characterized in that spinning a polyurethane polymer prepared by a process comprising reacting a copolymerized polyalkyleneether diol composed of different alkyleneethers containing 2–10 carbon atoms and 4,4'-diphenylmethane diisocyanate in a ratio to make a urethane portion having a number average molecular weight of 6000–9500 so that a urethane prepolymer of which both terminal ends consist of isocyanate groups, and thereafter additionally loading 4,4'-diphenylmethane diisocyanate in a ratio as to make a urea portion having a number average molecular weight of 650–950 and reacting with a bifunctional diamine.

6. A method for producing a polyurethane elastic fiber according to claim 5 characterized in that the fiber has an elongation at break of 500% or more and a modulus at 300% elongation of 0.20 g/d or less of no greater than 0.20 g/d.

* * * * *